US005937890A

United States Patent [19]
Marandi

[11] Patent Number: 5,937,890
[45] Date of Patent: Aug. 17, 1999

[54] INSERT FOR FLOW THROTTLING BALL VALVES

[75] Inventor: Ali Marandi, Irvine, Calif.

[73] Assignee: Griswold Controls, Inc., Irvine, Calif.

[21] Appl. No.: 09/004,946

[22] Filed: Jan. 9, 1998

[51] Int. Cl.[6] ............................... F16K 47/04; F16K 5/12

[52] U.S. Cl. .................... 137/271; 251/209; 251/315.16; 251/127

[58] Field of Search .................................... 251/208, 209, 251/315.01, 315.16, 315.03, 118, 127; 137/269, 271, 270

[56] References Cited

U.S. PATENT DOCUMENTS

| | | | |
|---|---|---|---|
| 915,543 | 3/1909 | Billiard . | |
| 1,175,328 | 3/1916 | Wright . | |
| 1,454,222 | 5/1923 | Palmer et al. . | |
| 1,622,406 | 3/1927 | Wilhjelm . | |
| 1,972,151 | 9/1934 | Link . | |
| 2,115,675 | 4/1938 | Tremmel . | |
| 2,707,971 | 5/1955 | Lamar . | |
| 3,146,792 | 9/1964 | Donnelly et al. . | |
| 3,386,461 | 6/1968 | Fisher . | |
| 3,542,337 | 11/1970 | Scaramucci . | |
| 3,563,511 | 2/1971 | Bentley-Leek | 251/209 |
| 3,707,161 | 12/1972 | Crawford | 137/269 |
| 4,111,229 | 9/1978 | Christian . | |
| 4,111,392 | 9/1978 | McClurg et al. . | |
| 4,130,128 | 12/1978 | Kaneko . | |
| 4,226,263 | 10/1980 | Muchow . | |
| 4,989,833 | 2/1991 | Polón . | |
| 5,074,522 | 12/1991 | Reynolds et al. . | |
| 5,135,019 | 8/1992 | Dupont . | |
| 5,509,446 | 4/1996 | Bey . | |
| 5,551,467 | 9/1996 | Booth et al. | 251/315.01 X |
| 5,593,135 | 1/1997 | Lester et al. | 251/315.16 X |

OTHER PUBLICATIONS

Toyo, Auto Three–Flow Product Brochure.

Flow–Tek, Inc., Control Ball Series—Model VC Product Brochure.

Flow Characteristics and Installed Flow Charateristics, pp. 166–167, unknown source.

Chapter entitled “Heating, Ventilating and Air Conditioning Control Systems”, pp. 627–629, unknown source.

*Primary Examiner*—Kevin Lee
*Attorney, Agent, or Firm*—Lyon & Lyon LLP

[57] ABSTRACT

A volume control insert for a ball valve that is attachable in a fluid passage of the ball valve to provide a predetermined flow condition therethrough. The insert has a convex shape corresponding to an outer surface of a valving member seated in the ball valve, and has a connector disposed on its periphery to attach the insert across the fluid passage. The insert has an elongate slot through it, such as an oblong or parabolic shaped opening, adapted to provide the predetermined flow condition. A plurality of such inserts may be furnished with a ball valve to provide a range of predetermined flow conditions that may be individually selected for the ball valve. Preferably, each of the inserts include a parabolic opening therethrough, the parabolic opening providing a substantially equal percentage flow characteristic between maximum and minimum flow rate conditions when the valving member is rotated each degree of movement between its full open and full closed positions.

33 Claims, 6 Drawing Sheets

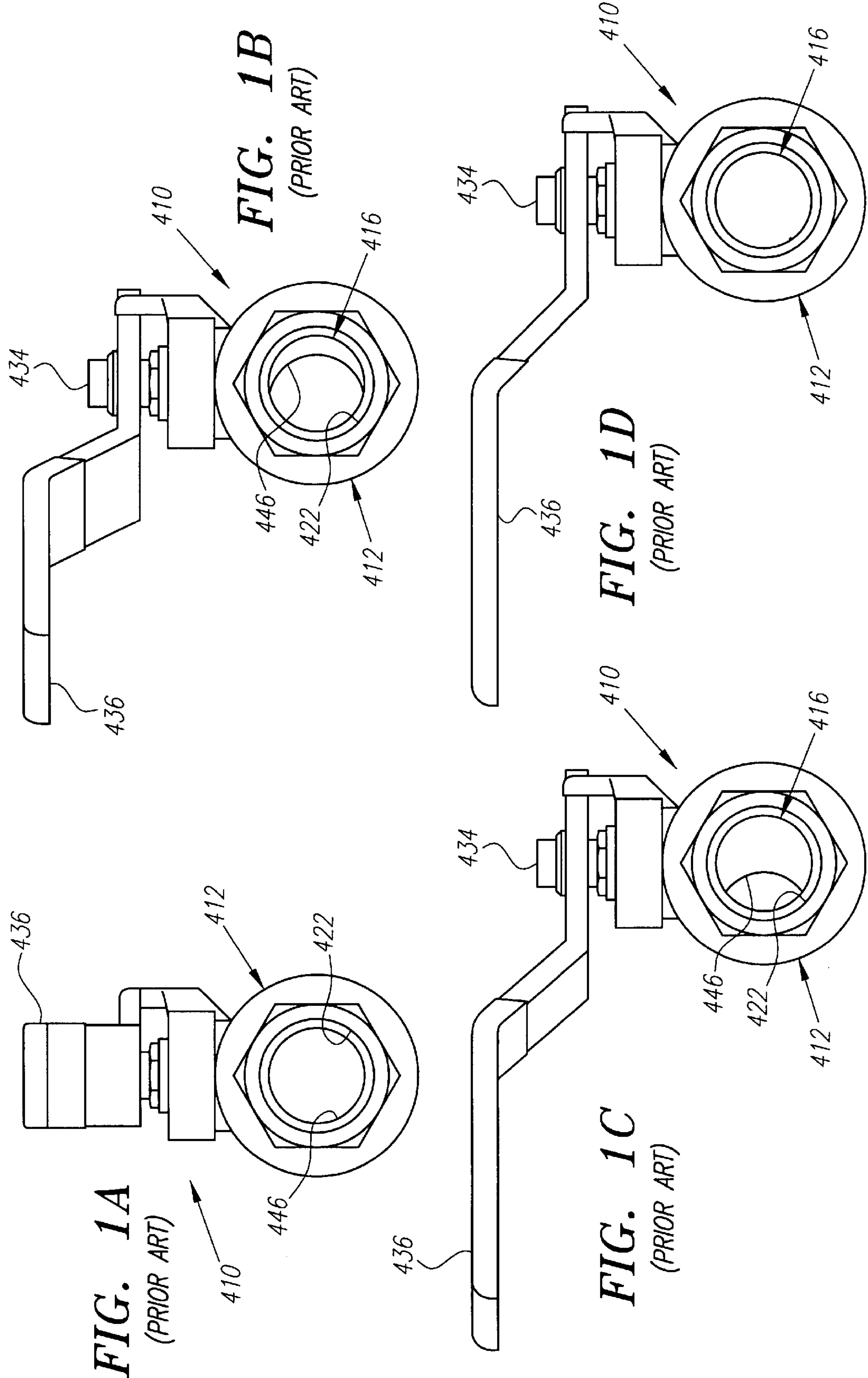
FIG. 1A
(PRIOR ART)
FIG. 1B
(PRIOR ART)
FIG. 1C
(PRIOR ART)
FIG. 1D
(PRIOR ART)
410
412
416
422
434
436
446

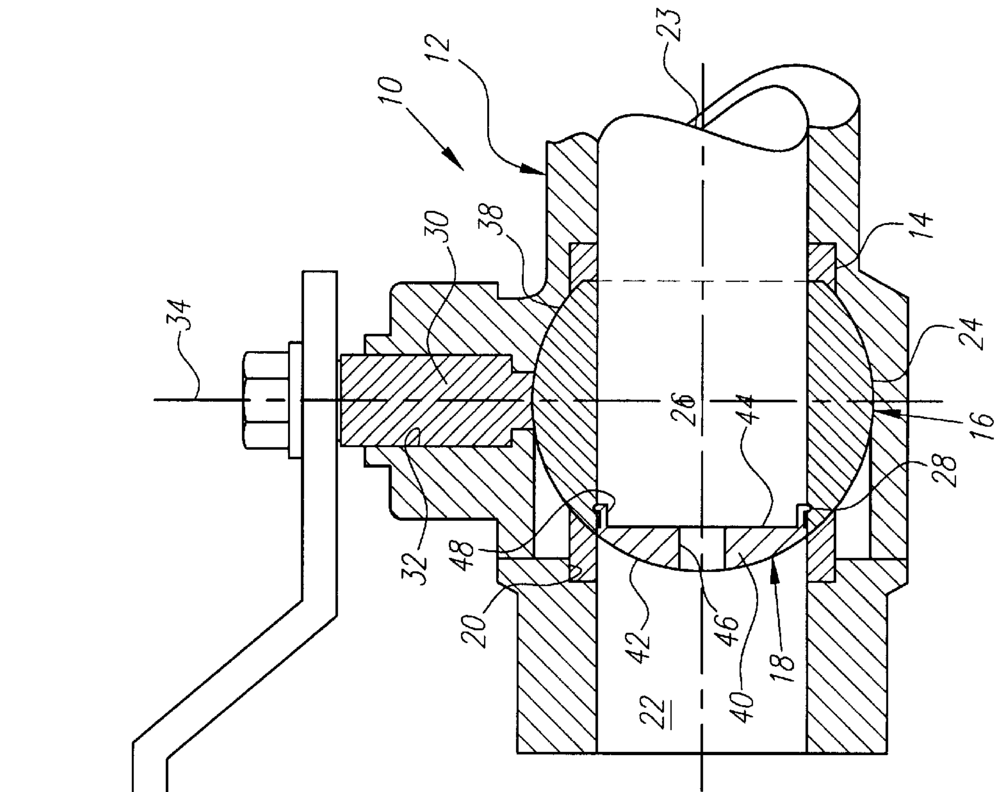
36
FIG. 2A
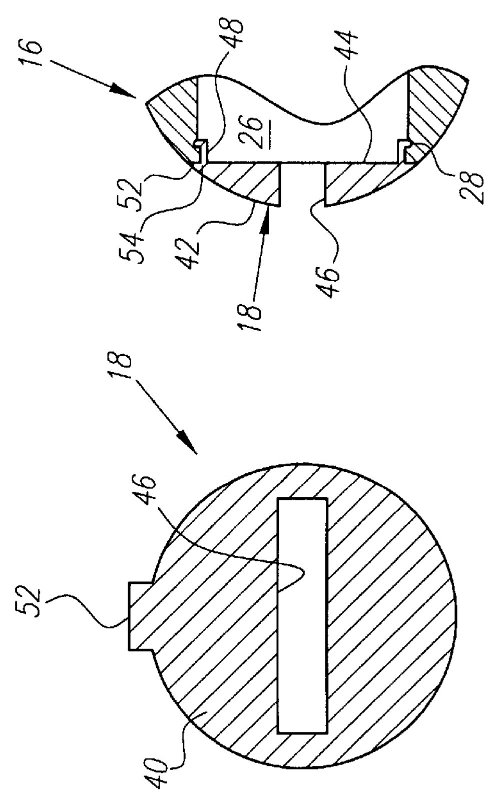
FIG. 2C
FIG. 2B

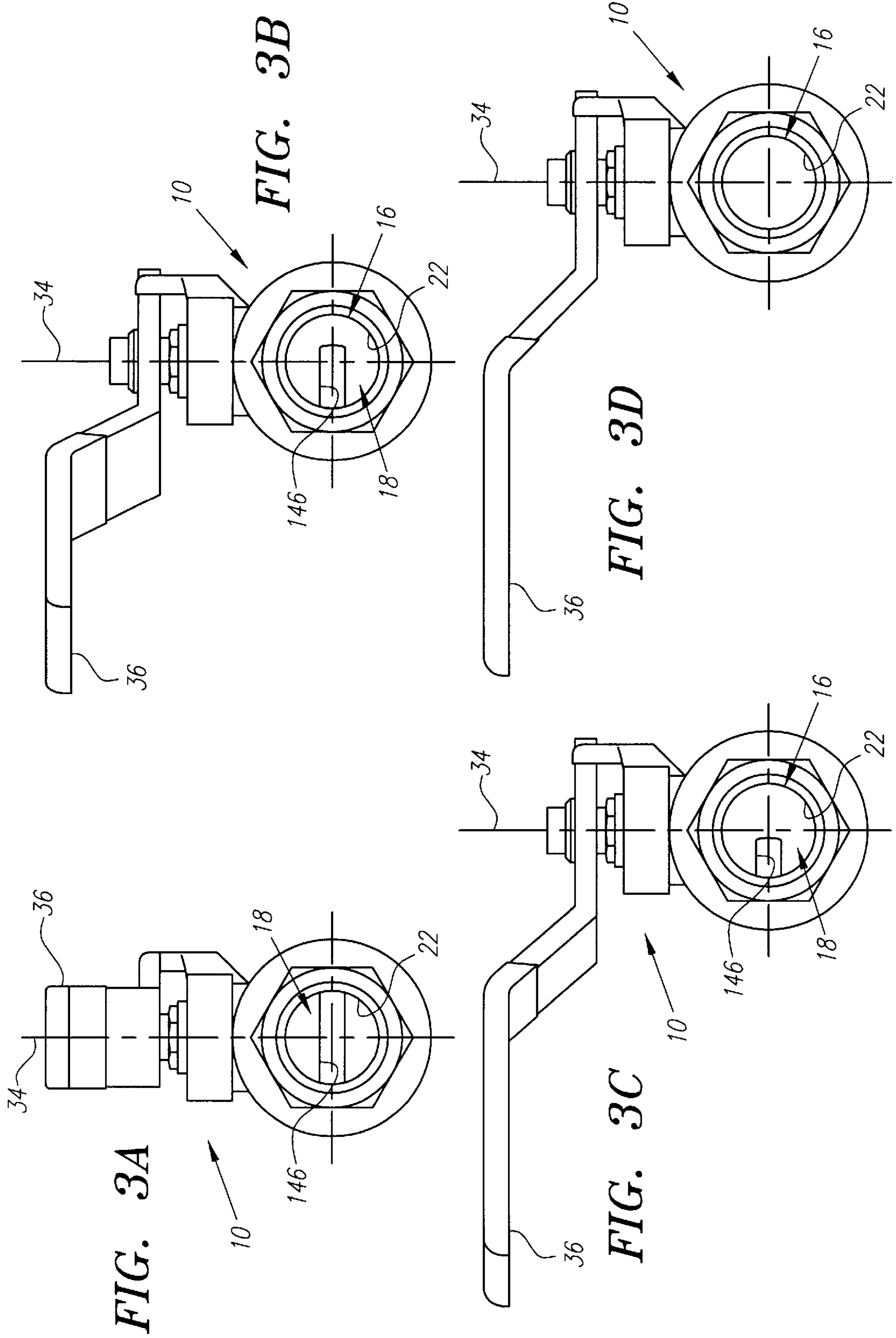
FIG. 3A
FIG. 3B
FIG. 3C
FIG. 3D
10
16
18
22
34
36
146

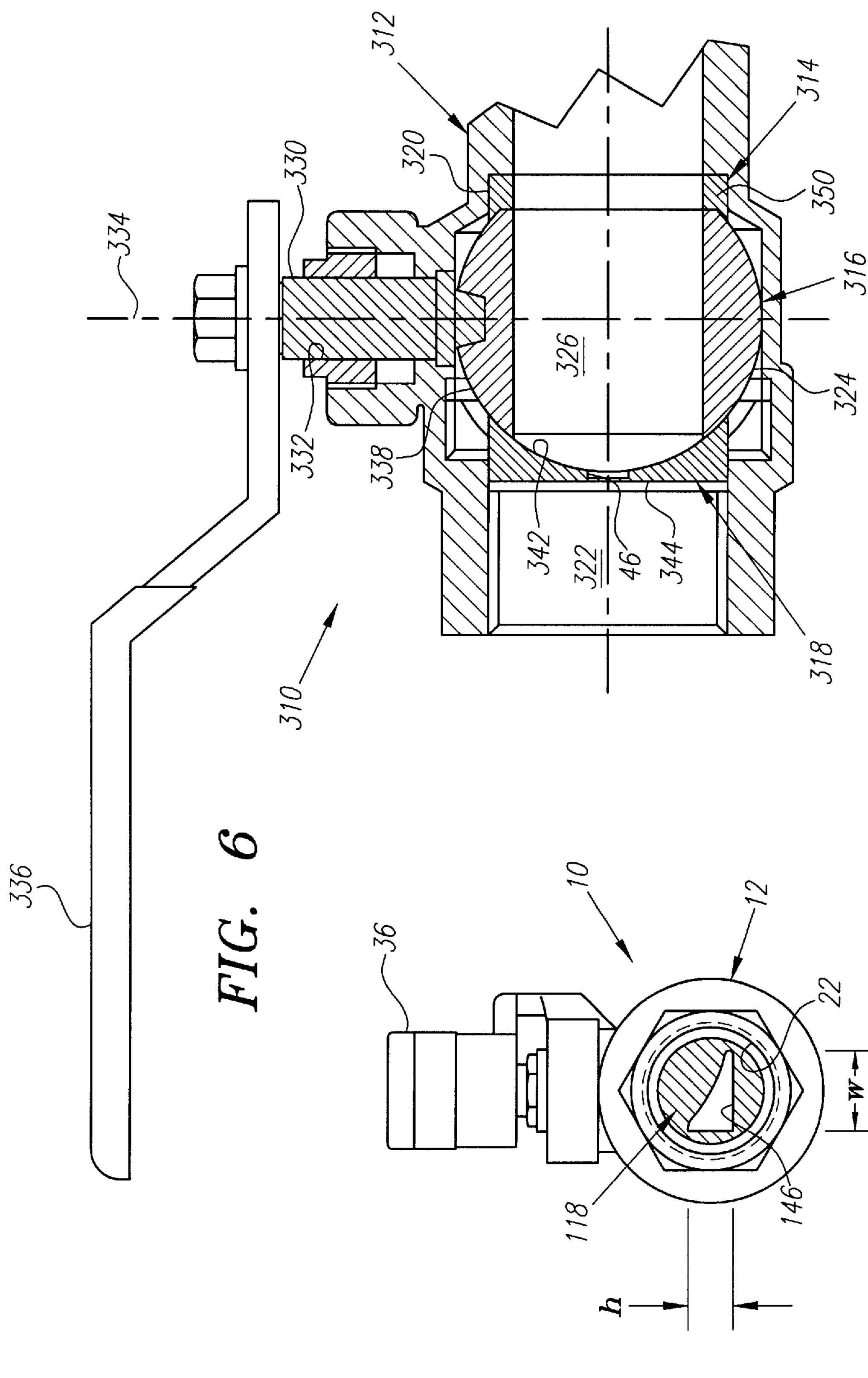
FIG. 6
FIG. 4

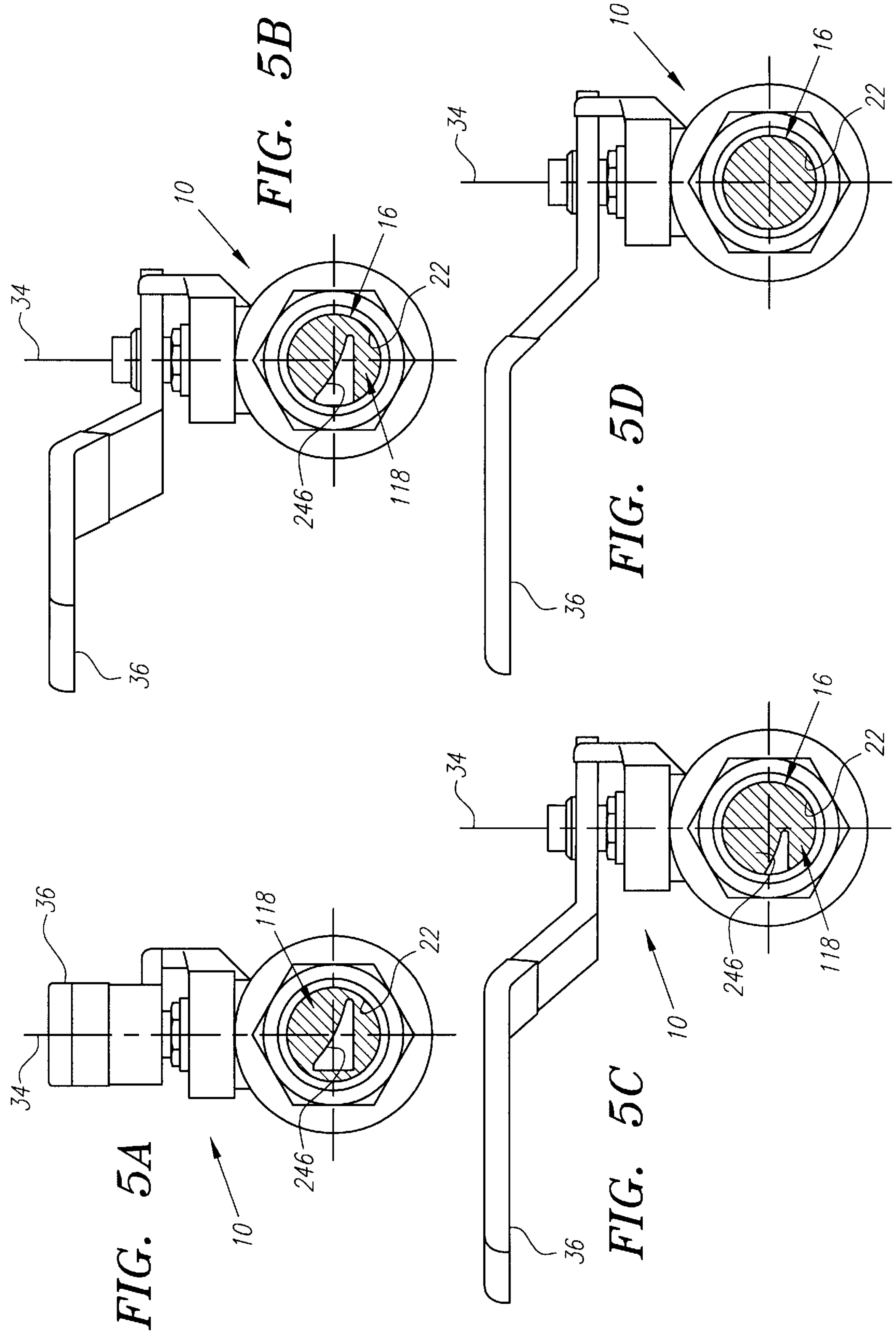
FIG. 5A
FIG. 5B
FIG. 5C
FIG. 5D
10
16
22
34
36
118
246

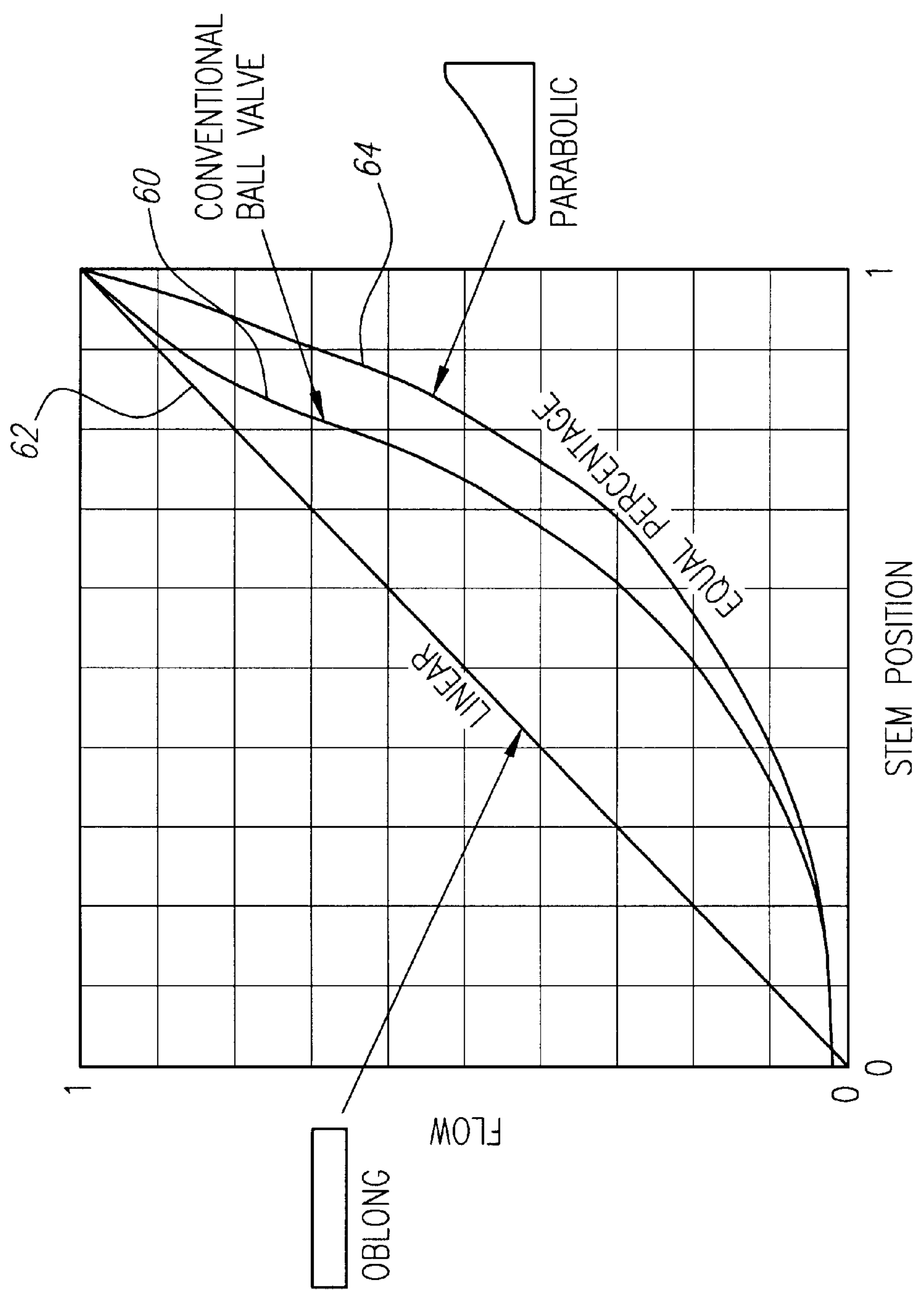
*FIG. 7*

INSERT FOR FLOW THROTTLING BALL VALVES

FIELD OF THE INVENTION

The present invention relates generally to ball valves for volumetric control of fluid flow in a conduit, and more particularly to an insert for a ball valve and a set of inserts for providing a selectable flow rate condition in a heating ventilating and air conditioning system.

BACKGROUND

Ball valves, whether manually, hydraulically or electrically actuated, typically include a spherical ball entrapped between two seals secured within a valve body. An actuator, by means of a sealed stem extending from the ball, rotates the ball within the valve body between full open and full closed positions.

With typical ball valves, such as that shown in FIGS. 1A through 1D, the spherical ball has a uniform diameter bore extending through it, corresponding to similar passages extending through each end of the valve body. When in the full open position, the bores are aligned axially, thereby providing the least amount of resistance to fluid flow through the passages. By gradually turning the handle (or other actuator) attached to the stem, the exposed area of the ball and its mating seal resemble a small "nail" or moon shape that widens dramatically with each degree of movement of the handle, as shown particularly in FIGS. 1B and 1C. The resulting intersecting area of the two round passages creates an unpredictable and extremely sensitive "exposed" area to fluid flow that often makes ball valves difficult to set for a desired flow rate.

For example, ball valves are often used to balance hydronic (heating ventilating and air conditioning or "HVAC") closed loop systems. The ball valves are often provided with built-in venturi and/or orifices to allow precise measurement of the flow rate through the ball valve. However, the standard configuration of a ball valve may not facilitate precise setting because of the sensitivity by degree of handle movement. Thus, it may take several passes on either side of the final actuator setting before a desired flow rate is achieved.

To minimize this sensitivity problem, some ball valves have been provided with relatively small bore sizes to alleviate low flow settings. Although providing better volume control, these ball valves may create an undesirably high friction loss for systems that require high flow conditions when the valve is fully open.

Alternatively, the passage of the ball valve may be provided with alternative bore openings in an attempt to improve throttling and control. For example, Toyo Company of Japan distributes ball valves that have spherical balls with diamond-shaped bores. In addition, U.S. Pat. No. 5,593,135 issued to Lester et al. discloses a ball valve that has a plastic spherical ball with a cylindrical bore extending most of the way through the ball. At one end, however, the bore is partially closed by a throttling wall formed as part of the spherical ball. The throttling wall has an oblong opening therein for providing a more linear flow condition as the ball is rotated within the valve body.

Such ball valves, however, require uniquely cast or machined spherical balls for each desired flow condition or "$C_v$ offering." In addition, diamond-shaped or other special port openings may not provide linear or other desired volumetric flow control for certain applications. Further, the cost and difficulty in manufacturing such customized ball valves may be further exacerbated when they are machined or formed from conventional materials, such as brass or stainless steel.

Accordingly, there is a need for a ball valve that provides more precise volumetric flow control than conventional ball valves.

In addition, there is a need for a ball valve that may provide a variety of selectable flow conditions, and that may be competitively manufactured substantially without customized forming methods.

SUMMARY OF THE INVENTION

The present invention is directed to a ball valve and to an insert for a ball valve adapted to provide precise, substantially linear and/or equal percentage volumetric flow control of fluid flow through the ball valve. The present invention is also directed to a volume control insert and to a set of inserts for a ball valve for providing a variety of predetermined flow conditions.

In one aspect of the present invention, an insert device is provided that is attachable to a valving member in a ball valve for providing a predetermined flow condition through the ball valve. The insert device has a substantially convex shape corresponding to an outer surface of the valving member. A connector is disposed on a periphery of the insert device to attach it across a passage through the valving member. The insert device has an elongate slot, such as an oblong or parabolic shaped opening, through it that is adapted to provide the predetermined flow condition through the passage of the valving member.

In another aspect of the present invention, a versatile flow control device is provided that includes a ball valve and a plurality of volume control inserts for providing a range of predetermined flow conditions through the ball valve. The ball valve has a valve housing with upstream and downstream passages extending into and out of a valve seat within the valve housing, thereby defining a longitudinal axis through the valve housing.

A valving member, with a bore extending through it, is rotatably mounted within the valve seat, such that the bore is alignable with the longitudinal axis. The bore and the upstream and downstream passages together define an adjustable fluid passage through the valve housing as the valving member is turned between full open and full closed positions.

The plurality of inserts are individually attachable across the fluid passage, each of the inserts having an elongate opening therethrough adapted to provide a predetermined flow condition through the fluid passage. The valving member and each insert include a connector for attaching the insert to the valving member across the bore, such as cooperating legs and pockets.

In a third aspect of the present invention, a ball valve is provided that allows substantially linear volumetric flow control. The ball valve includes a valve housing having a passage extending through it along a longitudinal axis. A valving member, having a bore extending through it, is seated in the valve housing, the bore being alignable with the passage. The valving member is rotatable about a transverse axis between open and closed positions, such that the bore and passage define a fluid passage adjustable between maximum and minimum flow rate conditions as the valving member is rotated between its open and closed positions respectively.

The ball valve includes a volume control member extending substantially across the fluid passage that has a parabolic opening therethrough. The parabolic opening has a parabolic shape adapted to provide a substantially equal percentage flow characteristic between the maximum and minimum flow rate conditions when the valving member is rotated, i.e. by each degree of movement of the valving member between its open and closed positions. Preferably, the volume control member is a volume control insert that is attachable across said fluid passage, such as that described above.

Accordingly, a principal object of the present invention is to provide a volume control insert and a set of such inserts that may be selectively attached to a ball valve to provide a predetermined flow condition through the ball valve.

It is also an object to provide a ball valve that provides a precise and/or substantially linear predetermined flow condition and that may not require customized machining or casting.

Other objects and features of the present invention will become apparent from consideration of the following description taken in conjunction with the accompanying drawings.

BRIEF DESCRIPTION OF THE DRAWINGS

FIGS. 1A through 1D are cross-sectional end views of a conventional ball valve, showing the spherical ball being moved between its full open and full closed positions.

FIG. 2A is a cross-sectional view of a ball valve in accordance with the present invention.

FIG. 2B is a front view of a volume control insert in accordance with the present invention.

FIG. 2C is a partial cross-sectional view of an alternative embodiment of the ball valve of FIG. 2A.

FIGS. 3A through 3D are cross-sectional end views of the ball valve of FIG. 2A, showing the valving member being moved between its full open and full closed positions.

FIG. 4 is an end view of a ball valve in accordance with the present invention having a parabolic opening across the fluid passage of the ball valve.

FIGS. 5A through 5D are cross-sectional end views of the ball valve of FIG. 4.

FIG. 6 is a cross-sectional view of an alternative embodiment of a ball valve in accordance with the present invention.

FIG. 7 is a table comparing the flow characteristics of a conventional ball valve with ball valve openings in accordance with the present invention.

DETAILED DESCRIPTION OF THE PREFERRED EMBODIMENTS

Turning now to the drawings, FIG. 2A shows a ball valve 10 in accordance with the present invention. The ball valve 10 generally includes a valve housing 12, a valve seat 14, a valving member 16, and a volume control insert 18. The valve housing 12, which may be provided from conventional materials, has a cavity 20 for receiving the valve seat 14 and valving member 16, and a passage 22 extending axially in and out of the cavity 20 along the longitudinal axis 23. The passage 22 defines a conduit through which a fluid, such as conditioned air, may flow when the ball valve 10 is installed in a fluid delivery system, such as a hydronic HVAC system (not shown).

The valve seat 14 is a sealing member for rotatably seating the valving member 16 within the cavity 20. The valve seat 14 provides a fluid-tight seal between an outer surface 38 of the valving member 16 and the valve housing 12, while allowing the valving member 18 to be rotated therein. The valve seat 14 is generally provided from conventional materials, such as plastic or compound plastic, and more preferably Teflon, and may be provided in a plurality of segments, such as upstream and downstream portions or upper and lower portions (not shown), which may be individually mounted in the cavity 20 to seat the valving member 16.

The valving member 16 is generally a substantially spherical ball 24 having a cylindrical bore 26 extending axially therethrough. The cylindrical bore 26 generally has a diameter corresponding substantially to the diameter of the passage 22 extending through the valve housing 12. The spherical ball 24 also includes a pocket 28 within the bore 26 for securing the volume control insert 18, as explained further below. Preferably, a plurality of pockets 28 are provided at predetermined locations about the periphery of the bore 26 adjacent one end thereof to detachably secure the volume control insert 18 in a predetermined orientation, although alternatively, the valving member 16 may include an annular groove (not shown) instead.

The valving member 16 is generally formed from conventional ball valve materials that provide a durable device capable of withstanding the flow conditions and fluids encountered during its use. Preferably, the valving member is machined from a metal, such as brass or stainless steel, thereby providing precise tolerances as compared to other processes such as casting. However, the valving member 16 may also be formed in alternative configurations, such as a cylindrical or frustoconical shape, and/or using alternative methods of manufacturing as should be appreciated by those skilled in the art.

In addition, the valving member 16 includes a valve stem 30 which extends from the valving member through a stem aperture 32 in the valve housing 12. Preferably, the valve stem 30 is attached to the spherical ball 28 along a transverse axis 34 that is substantially perpendicular to the longitudinal axis 23. A handle 36, or alternatively an electric, hydraulic or other motorized actuator (not shown), is attached to the valve stem 30 to rotate the valving member 16 within the valve seat 14 and cavity 20.

The ball valve 10 also includes a volume control insert 18 which is attachable across the bore 26 of the valving member 16. Preferably, the volume control insert 18 is a disc-shaped member 40 having a diameter corresponding substantially to the diameter of the bore 26 of the valving member 16. The disc-shaped member 40 has a convex outer surface 42 corresponding substantially to the outer surface 38 of the valving member 16. The inner surface 44 may be substantially flat, as shown, or may have a concave shape (not shown) similar to the outer surface 42.

Alternatively, the volume control insert 18 may have other shapes, such as a substantially rectangular shape (not shown). In such embodiments, the volume control insert 18 should be small enough to be insertable into the passage 22, and its outer periphery should correspond substantially to the shape of the bore 26 at the location where the volume control insert 18 is to be attached to the valving member 16. However, to facilitate manufacturing, a disk-shaped volume control insert 18 is preferred as it allows the valving member 16 to be made using generally conventional machining processes, rather than requiring specialized design and fabrication methods.

The disc-shaped member 40 has a plurality of legs or tabs 48 for securing the volume control insert 18 to the valving member 16. Preferably, the legs 48 are integrally formed on the periphery of the disc-shaped member 40 at predetermined locations corresponding to the pockets 28 in the valving member 16, and are resiliently deformable to facilitate attachment of the volume control insert 18 as described below. Alternatively, the disc-shaped member 40 may include an annular groove or tab (not shown) to correspond with a similar groove (not shown) in the valving member 16.

In addition, one or more of the legs 48 may have a unique configuration, for example a larger size than the other legs, corresponding to a similarly configured pocket in the valving member 16 (not shown). This leg configuration may ensure proper alignment of the opening 46 in the volume control insert 18 within the bore 26.

Alternatively, other cooperating connectors and/or attachment or aligning mechanisms may be provided on the periphery of the volume control insert 18 and the valving member 16, such as a cooperating thread pattern, adhesives and the like. For example, as shown in FIGS. 2B and 2C, the disc-shaped member 40 may include an aligning tab 52 adapted to be received in a corresponding slot 54 in the valving member 16.

Finally, the disc-shaped member 40 includes an elongate slot or opening 46 extending axially therethrough. In a first preferred embodiment, the opening 46 has an oblong shape (see FIGS. 3A–3D), while in a second preferred embodiment, the opening 46 has a parabolic shape (see FIGS. 5A–5D). When the volume control insert 18 is properly attached to the valving member 16, the opening 46 preferably extends along a plane substantially perpendicular to the transverse axis 34. Preferably, the opening 46 has a predetermined width, height and cross-sectional shape adapted to provide a preselected flow condition, i.e. to provide precise volumetric control between a maximum flow rate when the valving member 16 is in its full open position, and a minimum flow rate (typically zero) when the valving member 16 is in its full closed position.

The volume control insert 18 may be provided from a variety of conventional materials, such as plastic or metal, which may be formed using conventional processes. Injection molded plastics, such as are preferred, as they provide high tolerance inserts that may be efficiently manufactured. Such plastics also may ensure that the legs 48 are resiliently deflectable to facilitate attachment of the volume control insert 18.

The legs 48 are preferably substantially rigid yet sufficiently flexible to compress as the volume control insert 18 is directed into the passage 22 and bore 26, and to resiliently snap into the pockets 28 to secure the volume control insert 18 in place. The legs 48 may also be sufficiently deflectable to facilitate the legs 48 being directed out of the pockets 28 with a tool (not shown), thereby allowing the volume control insert 18 to be detached from the valving member 16 without damaging any of the components of the ball valve 10.

To assemble and use the ball valve 10 of the present invention, an assembled ball valve 10, without the volume control insert 18, is provided using conventional manufacturing processes. Preferably, the ball valve 10 is substantially conventional in its appearance and manufacturing, with the exception of the connector, such as the pockets 28 and/or the groove 54 (FIG. 2C), which may be provided within the bore 26 of the valving member 16. Alternatively, for retrofit applications, a conventional ball valve 410, such as that shown in FIGS. 1A–1D, without a connector may be provided, and a connector may be formed in the valving member 416, for example by machining pockets therein (not shown).

A set of volume control inserts, such as the exemplary volume control insert 18 shown in FIG. 2A, may be provided. Each volume control insert 18 has a similar diameter or cross-section corresponding to bore 26 of the valving member 16. Each volume control insert 18, however, has a different opening 46, such as an oblong or parabolic opening, having a different width and height, that corresponds to a predetermined maximum flow condition. Thus, the set of volume control inserts may provide a variety of flow conditions, i.e. a predetermined range of volumetric flow rates between the full open and full closed positions, that may be selected by the user.

A volume control insert 18 is selected from the set that provides a predetermined flow condition appropriate for the given application of the ball valve 10. With the valving member 16 in its full open position, the volume control insert 18 is directed into the passage 22. The opening 46 may be aligned along a plane normal to the transverse axis 34, for example by orienting an aligning member, such as an enlarged leg (not shown), on the volume control insert 18 with a corresponding enlarged pocket (not shown) in the valving member 16. As the volume control insert 18 enters the passage 22 and/or bore 26, the legs 48 may be compressed slightly as described above until the volume control insert 18 becomes coextensive with the pockets 28. The legs 48 then engage or snap into the pockets 28, securing the volume control insert 18 to the valving member 16 across the bore 26.

The ball valve 10 may then be installed in a flow system, such as a closed loop HVAC system, and used to provide volumetric flow control, the flow control of the ball valve 10 being dependent upon the size and shape opening 46 of the selected volume control insert 18. As illustrated in FIGS. 3A through 3D, a first preferred embodiment of a volume control insert 18 with a substantially oblong opening 146 is shown secured within a ball valve 10. In FIG. 3A, the ball valve 10 is shown in its full open position, in which the oblong opening 146 extends substantially across the passage 22.

As the handle 35 and valving member 16 are rotated, the oblong opening 146 is gradually withdrawn from the passage 22 (see FIGS. 3B and 3C) until the valving member 16 achieves the full closed position (see FIG. 3D), at which point the passage 22 is fully closed and sealed such that no fluid flows through the ball valve 10. Thus, the valving member 16 may be positioned at any position between those shown in FIGS. 3A and 3D, such as those shown in FIGS. 3B and 3C, thereby providing a selectable flow rate.

An important feature of the ball valve 10 is that for each degree of rotation of the valving member 16, the oblong opening 146 travels a linear distance along an arc defined by the periphery 38 of the valving member 16. Thus, the cross-section of the flow passage 22 is constricted in a substantially linear fashion as the valving member 16 is turned.

In contrast, as shown in FIGS. 1A through 1D, the flow passage 422 of a conventional ball valve 410 experiences a sudden and dramatic throttling as the valving member 416 is rotated. This sensitivity may exacerbate setting the ball valve 410 at a desired flow rate because as the valving member 416 is turned, the precise position for the desired flow rate may be passed over quickly, thereby causing the ball valve 416 to be difficult to balance at the desired setting.

Turning to FIGS. 4, and 5A through 5D, a second preferred embodiment of the volume control insert 118 is shown that has a parabolic opening 246. Other than the volume control insert 118 with parabolic opening 246, the other components of the ball valve 10 are similar to that described above. The parabolic opening 246 is "parabolic" in that the height h of the opening 246 changes across its width w, unlike the oblong opening 146 which has a substantially constant height. Similar to the oblong opening 146 above, the parabolic opening 246 provides improved volume control over a conventional ball valve, and in particular provides an equal percentage flow characteristic which is preferred in automatic temperature control systems.

As shown in FIG. 7, the parabolic opening 246 and the oblong opening 146 provide improved volumetric flow control over conventional ball valves. The curves 60, 62 and 64 show the flow rate of a conventional ball valve opening, an oblong opening and a parabolic opening, respectively, between minimum (0) and maximum (1) flow conditions as a function of the stem position of the ball valve, i.e. as the valve is rotated between its full closed (0) and full open (1) positions.

As explained above, the opening 46 travels along an arc defined by the periphery 38 of the valving member 16. Because fluid flow is axial through the passage 22, this arc is effectively projected onto the cross-section of the passage 22 through the ball valve 10. Thus, as the valving member 16 is turned a particular degree of rotation, the passage 22 is not obstructed in a true linear fashion.

Although the oblong opening 146 above approximates linear volume control, the parabolic opening 246 more accurately compensates for the arcuate or nonlinear path traveled by the volume control insert 118 because the parabolic opening 246 provides a cross-section that projects across the passage 22 to obstruct the passage 22 in a substantially equal percentage fashion as the valving member 116 is turned a particular degree of rotation. Thus, the height h of the parabolic opening 246 may be determined mathematically based upon the diameter of the valving member 16 and the desired flow condition range.

For example, as shown in FIGS. 5A and 5B, as the valving member 16 is initially turned from its full open position, the parabolic opening 246 travels more perpendicularly to the axis of the passage 22, thereby throttling the passage 22 quickly. Between FIGS. 5B and 5C, the passage 22 is throttled more slowly because the arc traveled by the opening 146 has become more tangential in relation to the longitudinal axis 23 (not shown in FIGS. 5A–5D) of the passage 22. Thus, the valving member of a conventional ball valve may have to be turned a larger angle to obtain a comparable rate of reduction in fluid flow through its passage. The parabolic opening 246 compensates for this by reducing the exposed cross-sectional area of the parabolic opening 246 as the valving member 16 is turned, thus providing substantially linear volumetric flow changes with each degree of rotation.

Turning to FIG. 6, an alternative embodiment of a ball valve 310 in accordance with the present invention is shown that includes a valve housing 312, a valve seat 314, a valving member 316 and a volume control insert 318. The valve housing 312 is generally similar to that previously described, having a passage 322 extending in and out of a central cavity 320. The valving member 316 is preferably a conventional spherical ball 324 having a cylindrical bore 326 extending axially therethrough. The valving member 316 is rotatable about a transverse axis 334 within the valve housing 312 by a valve stem 330 and an actuator, such as the handle 336.

Unlike the previous embodiments, the valve seat 314, rather than the valving member 316, is adapted to have the volume control insert 318 attached to it. Generally, the valve seat 314 includes a permanent portion 350 that is mounted within the cavity 320 to sealably seat the valving member 316 in the cavity 320. The volume control insert 318 may be attachable to the valve seat 314 and/or may form a portion of the valve seat 314 itself. The volume control insert 318 includes an opening 46, such as the oblong opening 146 or the parabolic opening 246 described above, and has a substantially concave inner surface 342 corresponding to an outer surface 338 of the valving member 316.

In one form, the volume control insert 318 may be an attachable portion of the valve seat 314, as shown in FIG. 6. The valve housing 312 may include one or more pockets (not shown) about the periphery of the passage 22 for receiving one or more corresponding legs or other connector (not shown) on the volume control insert 318. When the volume control insert 318 is attached to the valve housing 312, its inner surface 342 preferably sealably engages the outer surface 338 of the valving member 318 to help seat the valving member 316 and to help provide a fluid-tight seal between the passage 322 and bore 326.

Alternatively, the volume control insert may be attachable to the valve seat itself (not shown). For example, the valve seat and volume control insert may be similar to that shown in FIG. 2A, except that they include cooperating connectors, such as legs and pockets, that allow the volume control insert to be secured to the valve seat, rather than to the valving member.

Accordingly, an important feature of the present invention, is that a set of volume control inserts may be provided for a single ball valve. The set of inserts may provide a range of flow conditions that allow a user to select an insert that provides a predetermined flow condition for a particular application. The inserts may be easily attached to the ball valve, and optionally may be detached and replaced with a new insert as it wears out or as the flow conditions of the application change, without having to replace the entire ball valve.

Thus, a single ball valve in accordance with the present invention may replace an entire inventory of individual ball valves, giving a user improved versatility and convenience. Further, a ball valve in accordance with the present invention is manufactured using substantially conventional methods. There is no need to machine or mold a variety of customized valving members or individual ball valves to provide a range of volumetric flow conditions.

Finally, an insert in accordance with the present invention generally includes an opening, such as an oblong or parabolic shaped opening, that provides improved and/or substantially linear volumetric flow control, unlike conventional ball valves. Thus, when a ball valve in accordance with the present invention is installed within a fluid system, the ball valve may be more easily set at a desired flow rate.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. An insert device attachable to a valving member in a ball valve for providing a predetermined flow condition through the ball valve, said insert device comprising:

an insert member having a substantially convex shape corresponding to an outer surface of a valving member to which said insert member may be attached;

a connector on a periphery of said insert member, said connector being adapted to attach said insert member across a passage through the valving member; and an elongate slot through said insert member, said elongate slot being adapted to provide a predetermined flow condition through the passage of the valving member to which said insert member is attached.

2. The insert device of claim 1, wherein said connector comprises a plurality of legs extending from said periphery of said insert member, said legs being adapted to engage corresponding pockets in the valving member.

3. The insert device of claim 1, wherein said connector includes an aligning member for providing a predetermined orientation of said elongate opening when said insert member is attached across the passage of the valving member.

4. The insert device of claim 1, wherein said insert member comprises a disk having a diameter corresponding substantially to the passage through the valving member.

5. The insert device of claim 4, wherein said convex shape of said disk corresponds to a portion of a sphere, said sphere having an outer periphery substantially similar to the outer surface of the valving member.

6. The insert device of claim 1, wherein said insert member comprises plastic.

7. The insert device of claim 1, wherein said elongate slot comprises an oblong opening.

8. The insert device of claim 1, wherein said elongate slot comprises a parabolic opening.

9. A ball valve for providing a plurality of predetermined flow conditions therethrough, said ball valve comprising:

a valve housing having upstream and downstream passages extending therethrough, said upstream and downstream passages extending into and out of a valve seat within said valve housing, thereby defining a longitudinal axis through said valve seat;

a valving member rotatably mounted within said valve seat, said valving member having a bore extending therethrough, said bore being alignable with said longitudinal axis, said bore and said upstream and downstream passages together defining a fluid passage through said valve housing; and a plurality of disk-shaped inserts individually attachable across said fluid passage, each of said plurality of inserts having an opening therethrough adapted to provide a predetermined flow condition through said fluid passage.

10. The ball valve of claim 9, wherein said valving member and said plurality of inserts include a connector for attaching one of said plurality of inserts to said valving member across said bore, and wherein said plurality of inserts have a convex outer surface corresponding substantially to an outer surface of said valving member.

11. The ball valve of claim 9, wherein said valve seat and said plurality of inserts include a connector for attaching one of said plurality of inserts to said valve seat across said fluid passage adjacent said valving member, said plurality of inserts having a substantially concave inner surface corresponding to an outer surface of said valving member.

12. The ball valve of claim 9, wherein said opening comprises an elongate opening extending along a plane perpendicular to a transverse axis about which said valving member is rotatable within said valve housing.

13. The ball valve of claim 12, wherein said elongate opening comprises a parabolic opening adapted to provide an equal percentage flow characteristic for said valving member.

14. The ball valve of claim 9, wherein said upstream and downstream passages and said bore have substantially cylindrical cross-sections, and wherein said openings of said plurality of inserts have cross-sections adapted to partially block said fluid passage, thereby providing said predetermined flow conditions.

15. The ball valve of claim 9, wherein said valving member is formed from brass or stainless steel.

16. The ball valve of claim 9, wherein said plurality of inserts comprise plastic.

17. The ball valve of claim 9, wherein said plurality of inserts have a diameter corresponding substantially to a diameter of said bore through said valving member.

18. A ball valve for providing a plurality of predetermined flow conditions therethrough, said ball valve comprising:

a valve housing having upstream and downstream passages extending therethrough, said upstream and downstream passages extending into and out of a valve seat within said valve housing, thereby defining a longitudinal axis through said valve seat;

a valving member rotatably mounted within said valve seat, said valving member having a bore extending therethrough, said bore being alignable with said longitudinal axis, said bore and said upstream and downstream passages together defining a fluid passage through said valve housing; and a plurality of inserts individually attachable across said fluid passage, each of said plurality of inserts having an opening therethrough adapted to provide a predetermined flow condition through said fluid passage;

wherein said valving member and said plurality of inserts include a connector for attaching one of said plurality of inserts to said valving member across said bore; said connector comprising cooperating legs and pockets, said legs and pockets being formed in said valving member and said plurality of inserts.

19. A ball valve for providing substantially linear volumetric flow control, said ball valve comprising:

a valve housing having a passage extending therethrough along a longitudinal axis thereof;

a valving member seated in said valve housing and having a bore extending therethrough alignable with said passage, said valving member being rotatable about a transverse axis between open and closed positions, whereby said bore and said passage define a fluid passage adjustable between maximum and minimum flow rates as said valving member is rotated between said open and closed positions respectively; and a volume control member extending substantially across said fluid passage and having a parabolic opening therethrough, said parabolic opening having a parabolic shape adapted to provide substantially equal percentage flow between said maximum and minimum flow rates when said valving member is rotated each degree of movement between said open and closed positions.

20. The ball valve of claim 19, wherein said volume control member comprises a volume control insert that is attachable across said fluid passage.

21. The ball valve of claim 20, wherein said volume control insert and said valving member include a connector adapted to attach said volume control insert to said valving member across said bore.

22. The ball valve of claim 20, further comprising a valve seat within said valve housing, and wherein said volume control insert and said valve seat include a connector adapted to attach said volume control insert to said valve seat across said passage.

23. The ball valve of claim 20, wherein said connector comprises a leg on said volume control insert adapted to be received in a pocket in said valving member.

24. The ball valve of claim 20, wherein said connector includes an aligning member adapted to orient said parabolic opening along a plane perpendicular to said transverse axis when said volume control insert is attached to said valving member.

25. The ball valve of claim 19, wherein said volume control member comprises a set of volume control inserts individually attachable across said fluid passage, each volume control insert including a different size parabolic opening therethrough, whereby said set of volume control inserts provides a range of predetermined flow conditions through said fluid passage.

26. The ball valve of claim 19, wherein said volume control member forms a portion of a valve seat within said valve housing.

27. The ball valve of claim 19, wherein said volume control member extends across said passage adjacent said valving member.

28. The ball valve of claim 27, wherein said volume control member has a substantially concave inner surface corresponding to an outer surface of said valving member.

29. The ball valve of claim 19, wherein said volume control member is attachable to a valve seat within said valve housing.

30. A ball valve for providing a predetermined flow condition therethrough, said ball valve comprising:

a valve housing having upstream and downstream passages extending therethrough, said upstream and downstream passages extending into and out of a valve seat within said valve housing, thereby defining a longitudinal axis through said valve seat;

a valving member rotatably mounted within said valve seat, said valving member having a bore extending therethrough, said bore being alignable with said longitudinal axis, said bore and said upstream and downstream passages together defining a fluid passage through said valve housing; and a portion of said valve seat extending across said fluid passage and having an elongate opening therethrough adapted to provide a predetermined flow condition through said fluid passage.

31. The ball valve of claim 30, wherein said portion of said valve seat extending across said fluid passage is detachable.

32. An insert attachable to a valving member rotatably mounted in a ball valve for providing substantially equal percentage flow through a fluid passage extending through the ball valve, the insert comprising:

a disk-shaped member having a substantially convex shape corresponding to an outer surface of the valving member; and an opening in said disk-shaped member, said opening having a parabolic shape adapted to provide substantially equal percentage flow between maximum and minimum flow rates through the fluid passage when the valving member is rotated each degree of movement between its open and closed positions.

33. The insert of claim 32, further comprising a connector on a periphery of said disk-shaped member for attaching said disk shaped member across a bore through the valving member.

* * * * *